United States Patent [19]

Tadokoro et al.

[11] Patent Number: 4,612,770
[45] Date of Patent: Sep. 23, 1986

[54] TURBOCHARGED ENGINE WITH EXHAUST PURIFIER

[75] Inventors: Tomoo Tadokoro; Ikuo Matsuda; Haruo Okimoto, all of Hiroshima, Japan

[73] Assignee: Mazda Motor Corporation, Hiroshima, Japan

[21] Appl. No.: 759,300

[22] Filed: Jul. 26, 1985

[30] Foreign Application Priority Data

Jul. 31, 1984 [JP] Japan ............................. 59-161980
Jun. 10, 1985 [JP] Japan ............................. 60-125535

[51] Int. Cl.⁴ .................... F01N 5/04; F02B 37/00
[52] U.S. Cl. ................................ 60/602; 60/280; 60/284
[58] Field of Search ............. 60/600, 601, 602, 603, 60/280, 284

[56] References Cited

U.S. PATENT DOCUMENTS 4,008,572  2/1977  Woollenweber ............... 60/602
4,244,187  1/1981  Lane et al.
4,404,804  9/1983  Tadokoro ...................... 60/602

FOREIGN PATENT DOCUMENTS 113015      9/1981  Japan ............................. 60/602
56-161139  12/1981  Japan .
18522       3/1983  Japan ............................. 60/602
58-176417  10/1983  Japan .

Primary Examiner—Douglas Hart
Attorney, Agent, or Firm—Burns, Doane, Swecker & Mathis

[57] ABSTRACT

A control system for an automobile engine having intake and exhaust systems for respectively conducting intake gases to and exhaust gases from the engine comprises a turbocharger including a turbine disposed in the exhaust system and a blower disposed in the intake system and drivingly connected with the turbine, an exhaust purifying device disposed in the exhaust system downstream of the turbine with respect to the direction of flow of the exhaust gases, a choke valve for varying the effective cross-section of a portion of the exhaust system leading to the turbine, a control device for controlling the choke valve in dependence on an operating condition of the engine, and a correcting unit for controlling the choke valve to increase the effective cross-section during a particular engine operating condition associated with a cold start of the exhaust purifying device. The control device causes the choke valve to increase the effective cross-section during a high speed operating condition, but to decrease the effective cross-section during a low speed operating condition of the engine.

20 Claims, 7 Drawing Figures

TURBOCHARGED ENGINE WITH EXHAUST PURIFIER

BACKGROUND OF THE INVENTION

The present invention generally relates to a turbocharged automobile engine having an exhaust purifier on the exhaust system thereof and, more particularly, to a combination of the turbocharged engine with means for controlling the flow of exhaust gases through the exhaust driven turbine to accelerate warm-up of the exhaust purifying unit.

A turbocharged automobile engine having an exhaust purifying unit, for example, a catalytic converter or a thermal reactor (exhaust afterburner) is well known. The turbocharger comprises a blower or compressor, disposed on the intake system for the introduction of intake gases towards the engine, and an exhaust driven turbine disposed on the exhaust system for the discharge of exhaust gases towards the atmosphere. The compressor and the turbine are drivingly linked together to allow the compressor to be driven by the turbine then driven by the flow of the exhaust gases therethrough. The purpose of use of the turbocharger, and the advantage derived therefrom, are well known in the art.

When it comes to the use of the turbocharger in combination with the exhaust purifying unit, for example, the catalytic converter, which generally requires to be heated to its operating temperature in order for it to exhibit an acceptable performance, the presence of the exhaust driven turbine on the exhaust system upstream of the catalytic converter with respect to the direction of flow of the exhaust gases towards the atmosphere brings about a problem associated with the warm-up of the catalytic converter because in many cases the catalytic converter relies on the heat of the exhaust gases. More specifically, all of the structural elements of the turbine, as well as all of the pipings leading to and from the turbine, which are exposed to the flow of the exhaust gases, necessarily absorb heat from the exhaust gases and, therefore, during a particular engine operating condition, for example, a cold start of the engine, it often happens that the catalytic converter cannot be quickly warmed up to the operating temperature, allowing the emission of obnoxious exhaust compounds for a substantial time before it is subsequently heated to the operating temperature.

According to U.S. Pat. No. 4,244,187, patented Jan. 13, 1981, there is disclosed a solution to the above discussed problem. According to it, in addition to the well known bypass passage connecting the turbine inlet with the turbine outlet and having a waste gate disposed therein, another bypass passage is provided which may be termed as a shortcut passage as it connects the engine exhaust port or ports with the catalytic converter in a minimized distance. This shortcut passage provides a fluid circuit extending in parallel to the bypass passage having the waste gate, the inlet of which is provided with a switching valve for selectively directing the flow of exhaust gates towards the catalytic converter directly through the shortcut passage and through the turbocharger turbine. For controlling the switching valve, this U.S. patent makes use of an actuating and control means operable to cause the switching valve to direct the flow of exhaust gases towards the catalytic converter through the shortcut passage during the warm-up period to quickly heat the catalytic converter and also operable to cause the switching valve to direct it towards the catalytic converter through the turbine for normal power recovery after the warm-up period. The actuating and control means includes an electromagnetic valve assembly adapted to be electrically energized in response to the increase of temperature of at least one of the engine cooling fluid, the exhaust piping and the catalytic converter, and a spring-biased diaphragm valve having a diaphragm operatively coupled with the switching valve and having spring and non-spring chambers defined therein on respective sides of the diaphragm. The electromagnetic valve assembly is so designed that, when and so long as it is not energized on account of the temperature of the catalytic converter having not yet reached a predetermined value, the valve assembly can direct the vacuum, drawn at a portion of the intake system upstream of the compressor, to the spring chamber of the diaphragm valve, while the non-spring chamber is vented to the atmosphere, causing a pressure differential that will overcome the spring force acting on the diaphragm and move the switching valve so as to block the flow of exhaust gases through the turbine.

Aside from the problem associated with the warm-up of the exhaust purifying unit, attempts have been made to improve the turbocharger with a view to further increasing the maximum available power output of the automobile engine even at a low engine speed. By way of example, the Japanese Laid-open Utility Model Application No. 56-161139, published Dec. 1, 1981, discloses the turbine inlet passage so divided and so partitioned only at a portion adjacent the turbine inlet as to provide a main passage section and a controllable passage section, which controllable passage section is adapted to be choked either when the engine speed is low or when the load on the engine is high and to be opened either when the engine speed is high or the load on the engine is low.

Japanese Laid-open Patent Publication No. 58-176417, published Oct. 15, 1983, discloses the use of at least one pivotally supported vane member so disposed in the vicinity of the turbine inlet as to adjust the effective cross-section of the turbine inlet nozzle according to the engine operating condition represented by the engine speed and/or the load on the engine. Specifically, at a high engine speed, the vane member is in position to increase the nozzle cross-section to its maximum value, but at a low engine speed, the vane member is in position to reduce the nozzle cross-section to allow the exhaust gases to flow at a high velocity through the turbine thereby driving the latter at a high speed for the quick boosting of the engine output power. A similar example, but wherein the vane member can assume one of the two opposite, "fully open" and "reduced" positions according to a particular engine operating condition, is also disclosed in Japanese Laid-open Patent Publication No. 60-19918.

While all of the above mentioned Japanese publications are silent as to the use of the exhaust purifying unit in the environments of the turbocharged engine, it has been found that even the throttling of the flow of the exhaust gases entering the turbocharger turbine constitutes an additional cause of the reduced exhaust temperature. More specifically, as the exhaust gas flow is throttled by the vane member, the turbine can be driven at an increased speed. However, the higher the flow of the exhaust gases entering the turbine, the greater the amount of heat energy of the turbine, and the temperature drop of the exhaust gases is correspondingly accelerated.

In view of the fact that the catalytic converter can work satisfactorily when and after heated to the operating temperature as is well known to those skilled in the art, the exhaust temperature drop which may occur for any reason before the exhaust gases enter the catalytic converter is desired to be minimized. Particularly during, and possibly for a moment subsequent to, the cold start of the engine at which time not only is the engine speed generally low, but the engine is cool with the exhaust temperature still low, the minimization of the exhaust temperature drop is very important. The throttling of the exhaust gas flow according to any one of the above mentioned Japanese publications may further lower the exhaust temperature which might have been lowered in contact with wall components forming the exhaust system of the engine, and therefore, the catalytic converter can not be quickly heated to the operating temperature.

SUMMARY OF THE INVENTION

The present invention has been devised with a view to substantially eliminating the above described problems and has for its object to provide the turbocharged engine having an exhaust gas throttling means with means for forcibly conducting the entire flow of exhaust gases through the turbocharger turbine during the cold start of the engine even though the engine operating condition during such cold start requires the exhaust gas flow to be throttled.

Another object of the present invention is to provide the turbocharged engine system of the type referred to above, wherein certain controllable elements of the engine system for controlling the operation of the engine are controlled to assist the quick warm-up of the exhaust purifying unit in such a way as to increase the flow of intake air, as to increase the amount of fuel supplied to the engine and/or as to retard the ignition timing.

According to the present invention, in contrast to the teachings suggested in any one of the previously discussed Japanese publications, the entire flow of the exhaust gases emerging from the engine is allowed to pass through the turbocharger turbine even during the cold start of the engine. However, during the engine operating condition which is similar to that during the cold start, but which occurs after the sufficient warm-up of the engine, the exhaust gas flow is throttled as is the case with the prior art teachings. Therefore, during the cold start, the loss of heat resulting from the increased flow velocity of the throttled exhaust gases can be advantageously avoided to assist the quick warm-up of the exhaust purifying unit disposed on the exhaust system downstream of the turbocharger turbine.

In addition to the throttling of the exhaust gas flow in the manner as described above, means may be taken to cause the engine to emit exhaust gases of relatively increased temperature during the cold start. This can be accomplished by increasing the engine intake charge, enriching the combustible air-fuel mixture to be supplied to the engine, and/or retarding the ignition timing from a normal time during the engine cold start.

BRIEF DESCRIPTION OF THE DRAWINGS

These and other objects and features of the present invention will become clear from the following description taken in connection with preferred embodiments with reference to the accompanying drawings, in which:

FIG. 6 is a graph similar to FIG. 3, but associated with the second embodiment of the present invention.

DETAILED DESCRIPTION OF THE EMBODIMENTS

Figure 1:
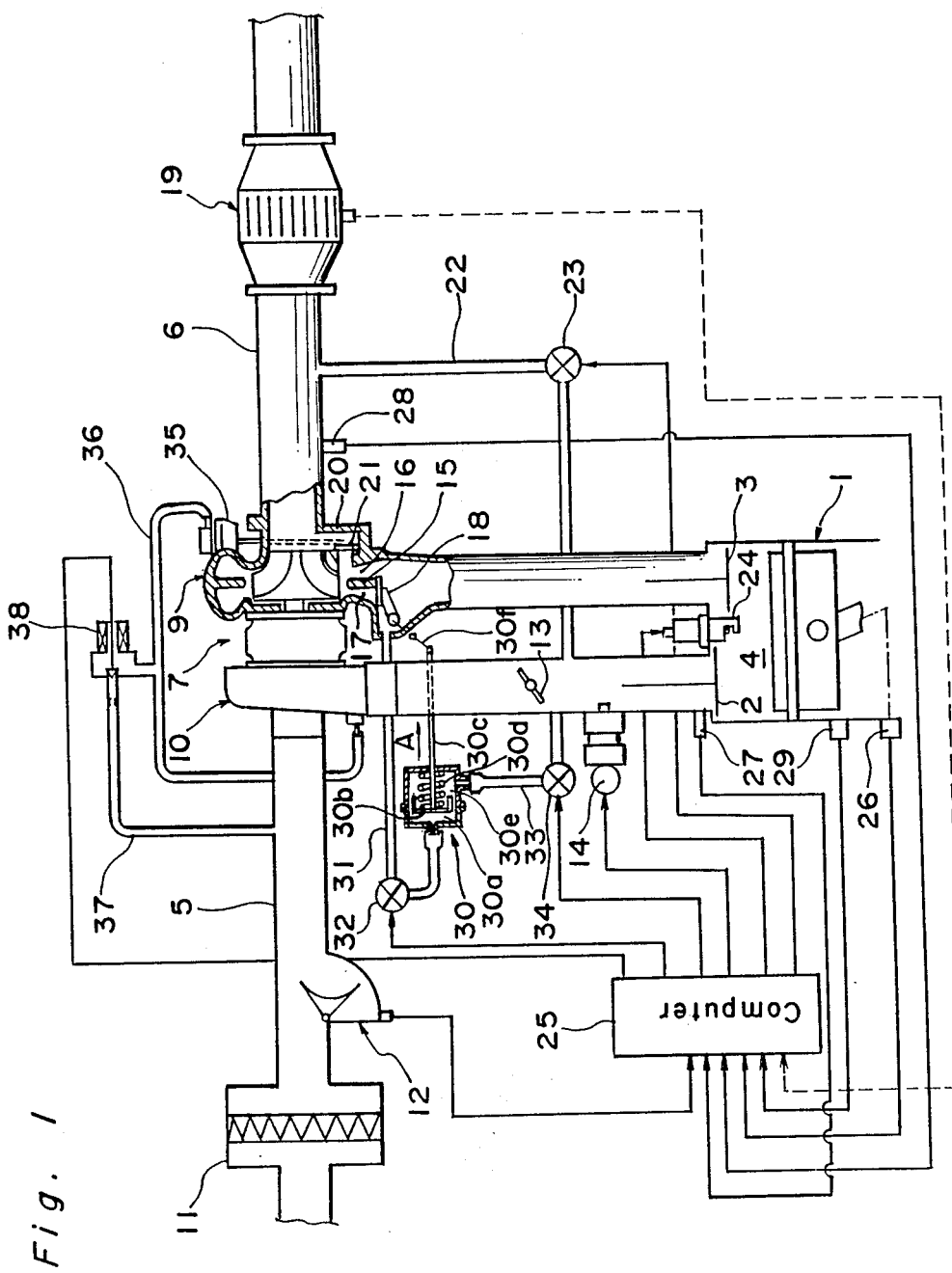
FIG. 1 is a schematic diagram showing a turbocharger engine system according to a first preferred embodiment of the present invention.

Before the description of the preferred embodiments of the present invention proceeds, it is to be noted that like parts are designated by like reference numerals throughout the accompanying drawings.

Referring first to FIG. 1, an automobile power plant shown therein comprises an internal combustion engine having at least one engine cylinder 1 with a piston reciprocateably accommodated therein so as to define a combustion chamber 4 therein. The engine cylinder 1 has an intake valve 2 for selectively opening and closing an intake port communicated with an intake piping 5, and an exhaust valve 3 for selectively closing and opening an exhaust port communicated with an exhaust piping 6, said intake and exhaust valves 2 and 3 being operable generally in an opposite sense to each other as is well known to those skilled in the art. The power plant also comprises a turbocharger 7 including a turbine 9, disposed on the exhaust piping 6 and adapted to be driven by exhaust gases flowing through the piping 6 towards the atmosphere, and a blower 10 disposed on the intake piping 5 and drivingly linked with the turbine 9 for supercharging, i.e., compressing, suction air flowing through the piping 5 towards the engine cylinder 1.

The intake piping 5 is communicated with the atmosphere through an air cleaner 11 and has an air flowmeter 11 installed downstream of the air cleaner 11, but upstream of the blower 10 with respect to the direction of flow of the suction air towards the engine cylinder 1. The intake piping 5 also has a throttle valve 13 disposed inside the piping 5 at a location downstream of the blower 10 for regulating the flow of the suction air, and a fuel injector 14 installed thereon downstream of the throttle valve 13 for injecting a controlled quantity of fuel into the intake piping 5 to form a combustible air-fuel mixture in admixture with the incoming suction air. The opening of the throttle valve 13, or simply, the throttle opening, is adjusted in the light of a load on the engine.

The exhaust piping 6 has an exhaust purifying unit, for example, a catalytic converter 19, installed thereon downstream of the turbine 9 for the purpose known to those skilled in the art and is, at a portion adjacent the inlet of the turbine 9, divided by a partition wall 15 into low and high speed gas passages 16 and 17. The exhaust piping 6 also has a diameter varying means which is, in the illustrated embodiment, constituted by a choke valve 18 positioned adjacent an upstream end of the high speed gas passage 17 for selectively opening and closing the high speed gas passage 17.

The exhaust system includes a bypass passage 20 generally known as defined within the turbine housing, which bypass passage 20 bypasses the turbine 9 with its opposite ends communicated respectively with the low speed gas passage 16 and the turbine outlet, i.e., a portion of the exhaust piping 6 downstream of the turbine 9. This bypass passage 20 has a wastegate valve 21 installed therein for selectively opening and closing the bypass passage 20 for controlling the boost, or supercharged, pressure not to exceed a predetermined maximum design value.

The power plant shown further comprises an exhaust gas recirculating (EGR) passage 22 communicated at one end with the intake piping 5 downstream of the throttle valve 13 and at the opposite end with the exhaust piping 6 downstream of the turbine 9, but upstream of the catalytic converter 19 for recirculating a portion of the exhaust gases back to the engine cylinder 1. The recirculation of the portion of the exhaust gases takes place only during the opening of an EGR control valve 23, disposed on the EGR passage 22, for the purpose known to those skilled in the art, i.e., for suppressing the excessive increase of the maximum combustion temperature thereby to minimize the emission of $NO_x$ components.

Elements of the automobile power plant which participate either directly or indirectly in the combustion that takes place in the combustion chamber 4, such as, for example, the wastegate valve 21, the choke valve 18, a spark plug 24 confronting the combustion chamber, and the fuel injector 14, are controlled in the following manner by a vehicle-mounted computer 25.

The computer 25 executes a control for the selective opening and closure of the choke valve 18, the metering of the fuel to be injected by the fuel injector 14 and/or the retardation of the firing timing of the spark plug 24, using such basis data as the flow of the suction air detected by the air flowmeter 12, the engine speed detected by an engine speed sensor 26, the boost or supercharged pressure, or the load, detected by an intake pressure sensor 27 installed on the intake piping 5 downstream of the throttle valve 13, the exhaust pressure detected by an exhaust pressure sensor 28 installed on the exhaust piping 6 downstream of the turbine 9, as well as the water temperature detected by a temperature sensor 29 disposed in an engine cooling system. The computer 25 may be designed to open the choke valve 18 when the temperature of the catalytic converter 19, detected by a converter temperature sensor as shown by the phantom line in FIG. 1, is lower than a predetermined value. Moreover, in view of the fact that the temperature of the catalytic converter 19 is apt to be quickly lowered when the engine is brought to a halt, the computer 25 may be designed to open the choke valve 18 for a predetermined time after the start of the engine regardless of the water temperature.

The choke valve 18 is actuated by a diaphragm actuator 30 utilizing as a source of drive, an exhaust pressure introduced from the exhaust piping 6 upstream of the turbine 9 and adjacent the choke valve 18. The actuator 30 has its housing, the interior of which is divided into first and second working chambers 30a and 30e by a diaphragm member 30b linked by a connecting rod 30c and a linkage 30f with the choke valve 18. The actuator 30 also has a biasing spring 30d housed within the second working chamber 30e and urging the diaphragm member 30b and, hence, the connecting rod 30c in a direction necessary to close the choke valve 18, which direction is counter to the direction shown by A. The first working chamber 30a is communicated with the exhaust piping 6 adjacent the choke valve 18 by means of a positive pressure passage 31 having a first control valve 32 disposed thereon and adapted to be selectively opened and closed in response to a signal from the computer 25. The second working chamber 30e is communicated with the intake piping 5 downstream of the throttle valve 13 by means of a negative pressure passage 33 having a second control valve 34 disposed thereon and adapted to be selectively opened and closed in response to a signal from the computer 28. The negative pressure passage 33 including the computer-controlled second control valve 34 is provided for the purpose of assisting the exhaust pressure, introduced into the first working chamber 30a for displacing the connecting rod 30c in the direction A against the spring 30d to open the choke valve 18, by the introduction of the negative pressure into the second working chamber 30e when the exhaust gas pressure has not yet reached a predetermined value required to overcome the biasing force of the spring 30d such as observable during, for example, a low speed, low load operating condition of the engine. Thus, it will readily be understood that, even during the low speed, low loading operating condition of the engine at which time the exhaust gas pressure is generally lower than or equal to that required to overcome the force of the spring 30d, the choke valve 18 can be assuredly opened.

The selective opening and closure of the wastegate valve 21 can be controlled by a diaphragm wastegate actuator 35 having as a source of drive thereof a discharge pressure of the blower 10. Specifically, the wastegate actuator 36 is fluid-coupled with the intake piping 5 downstream of the blower 10 and adjacent the blower discharge port through a passage 36 for the conduction of the blower discharge pressure thereto. The blower discharge pressure introduced in the passage 36 can be relieved through a relief passage to the intake piping 5 upstream of the blower 10 at a rate controlled by a metering valve 38 that is controlled by the computer 28 in such a manner that, when the pressure sensor 28 detects the exhaust pressure exceeding a predetermined value, the metering valve 38 can be closed to conduct the entire blower discharge pressure to the actuator 35 thereby to open the wastegate valve 21 for the bypass of a portion of the exhaust gases through the bypass passage 20 around the turbine 9. By so doing, the possibility of the suction air being excessively supercharged can be avoided. However, the passage 37 with the valve 38 may not be always essential.

The control of the choke valve 18 according to the present invention will now be described with reference to FIG. 2.

Figure 2:
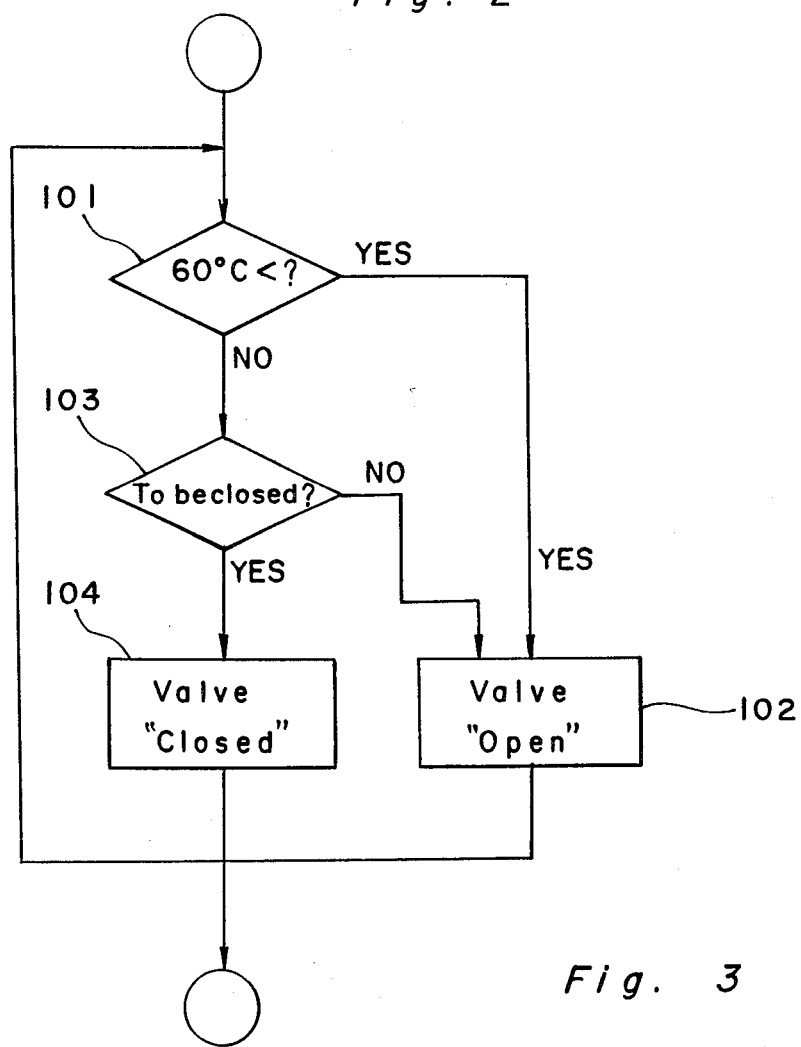
FIG. 2 is a flowchart showing the sequence of control of an exhaust choke valve used in the engine system of FIG. 1.

When the control of the choke valve 18 performed by the computer 25 is rendered incident to the start of the engine as shown in FIG. 2, a decision is made at step 101 to determined whether or not the water temperature of the engine cooling system detected by the temperature sensor 29 is lower than a predetermined value, for example, 60° C. During the cold start of the engine at which time the water temperature has not yet reached the predetermined value, the choke valve 18 is forcibly opened at step 102 regardless of the engine operating condition then assumed by the engine. At this time, the computer 25 applies "Open" command signals simultaneously to the first and second control valves 32 and 34 to permit the exhaust pressure and the negative pressure to be introduced into the first and second working chambers 30a and 30e of the actuator 30, respectively, through the associated passages 31 and 33, resulting in that the choke valve 18 is opened to increase the effective cross-section of that portion of the exhaust piping 6 adjacent the turbine inlet, that is, to allow the flow of the exhaust gases to the turbine 9 through the high speed gas passage 17 in addition to the flow of the exhaust gases through the low speed gas passage 16. Thus, the substantially entire flow of the exhaust gases is directed towards the catalytic converter 19 through the turbine 9 with the loss of heat of the exhaust gases consequently minimized, allowing a quick warm-up of the catalytic converter 19.

Figure 3:
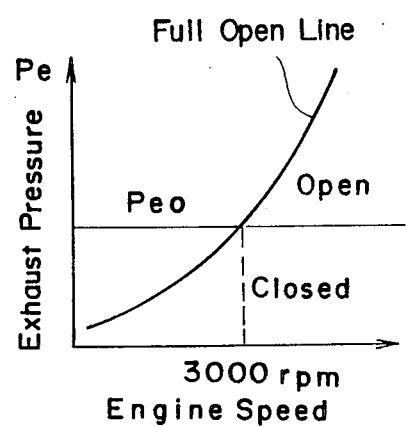
FIG. 3 is a graph showing engine operating ranges in which the exhaust choke valve is closed and opened, respectively.

On the other hand, after the warm-up of the engine with the water temperature exceeding the predetermined value, another decision is rendered at step 103 to determine if the engine is then being operated in an operating range in which the choke valve 18 is to be closed. For the decision making at step 103, it is stipulated as shown in FIG. 3 that, unless the exhaust pressure Pe downstream of the turbine 9 that increases with increase of the engine speed attains a predetermined value Peo, the engine is deemed operating in that operating range in which the choke valve 18 is required to be closed, but once it has exceeded the predetermined value Peo, the engine is deemed operating in an operating range in which the choke valve 18 is required to be opened. It is to be noted that the first and second mentioned operating ranges will be hereinafter referred to as "opening range" and "closing range", respectively, for the sake of brevity. It is also to be noted that, referring to the curve shown in FIG. 6 and illustrating the rate of increase of the exhaust pressure exhibited during the operation of the engine with the throttle valve held in the fully open position, the predetermined value Peo for the exhaust pressure Pe may lie at a point on the curve which corresponds to the engine speed of, for example, 3,000 rpm and may read, for example, 200 mHg.

Should the result of the decision at step 103 have indicated that the engine is being operated in the closing range, the choke valve 18 is closed at step 104. For this purpose, the computer 28 applies "Close" command signals to the first and second control valves 32 and 34, respectively. With the first and second control valves 32 and 34 closed, the closure of the choke valve 18 is effected only by the action of the spring 30d and permits the exhaust gases to flow only through the low speed gas passage 16 at a high velocity into the turbine 9 with the turbine 9 consequently driven at a high speed to promote the supercharging of the suction air. In other words, when and so long as the choke valve 18 is closed while the water temperature is higher than the predetermined value, the supercharging at a low speed operating condition of the engine takes place to boost the engine power output.

However, during a high speed operating condition of the engine with the exhaust pressure P3 exceeding the predetermined value Peo, the choke valve 18 is opened at step 104. In view of the fact that, during such high speed engine operating condition while the water temperature has exceeded the predetermined value, the exhaust gases upstream of the turbine 9 has already been increased in pressure, the computer 28 applies an "Open" command signal only to the control valve 32, causing the actuator 30 to open the choke valve 18 against the spring 30d. When the choke valve 18 is so opened, the exhaust gases emerging from the engine cylinder 1 flow through both of the low and high speed gas passages 16 and 17 into the turbine 9 to drive the blower 10 at a high velocity sufficient to supercharge the suction air to a pressure required during the high speed operating condition (the high load operating condition) of the engine.

Figure 4:
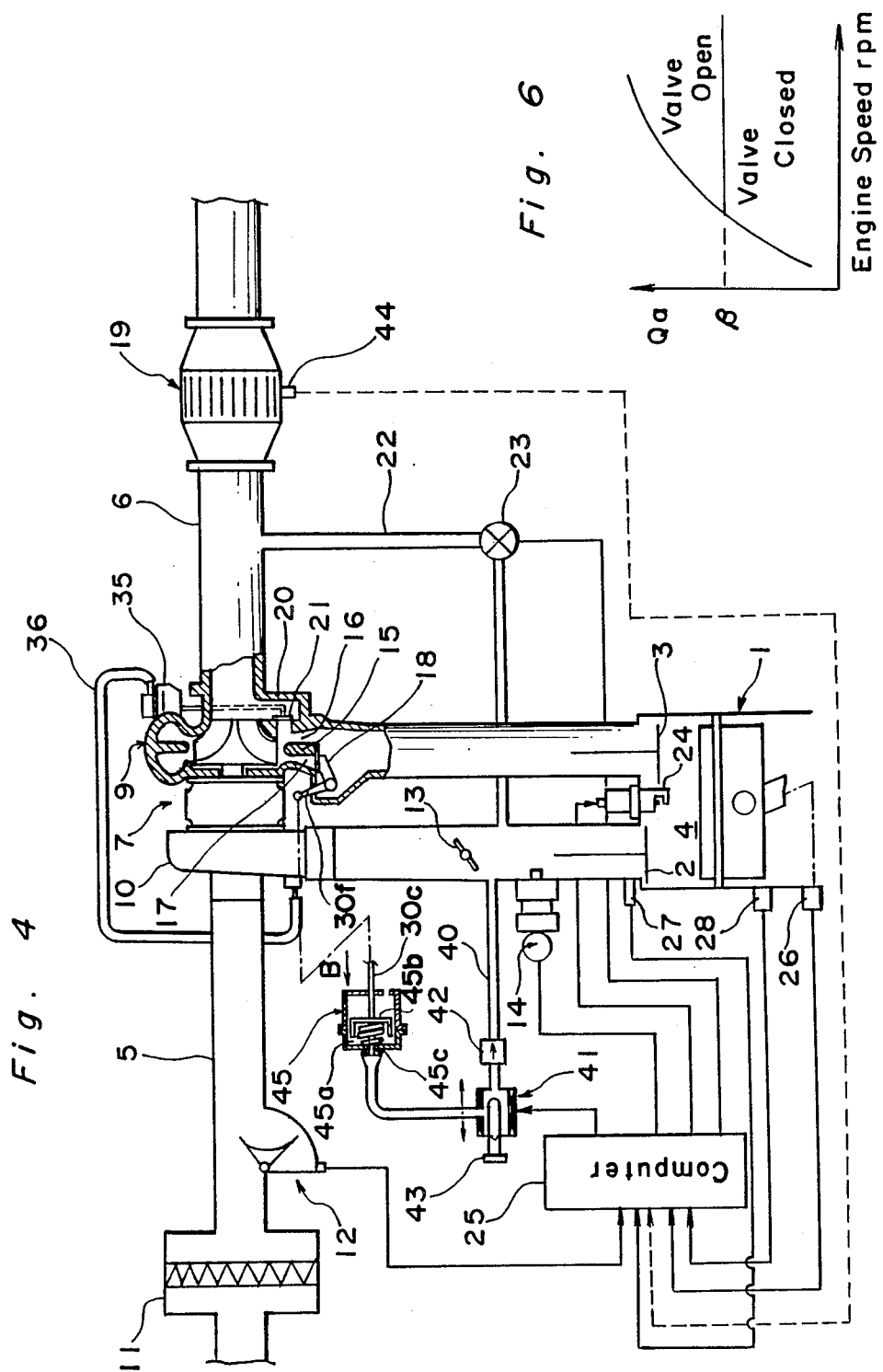
FIG. 4 is a diagram similar to FIG. 1, showing a second preferred embodiment of the present invention.
Figure 5:
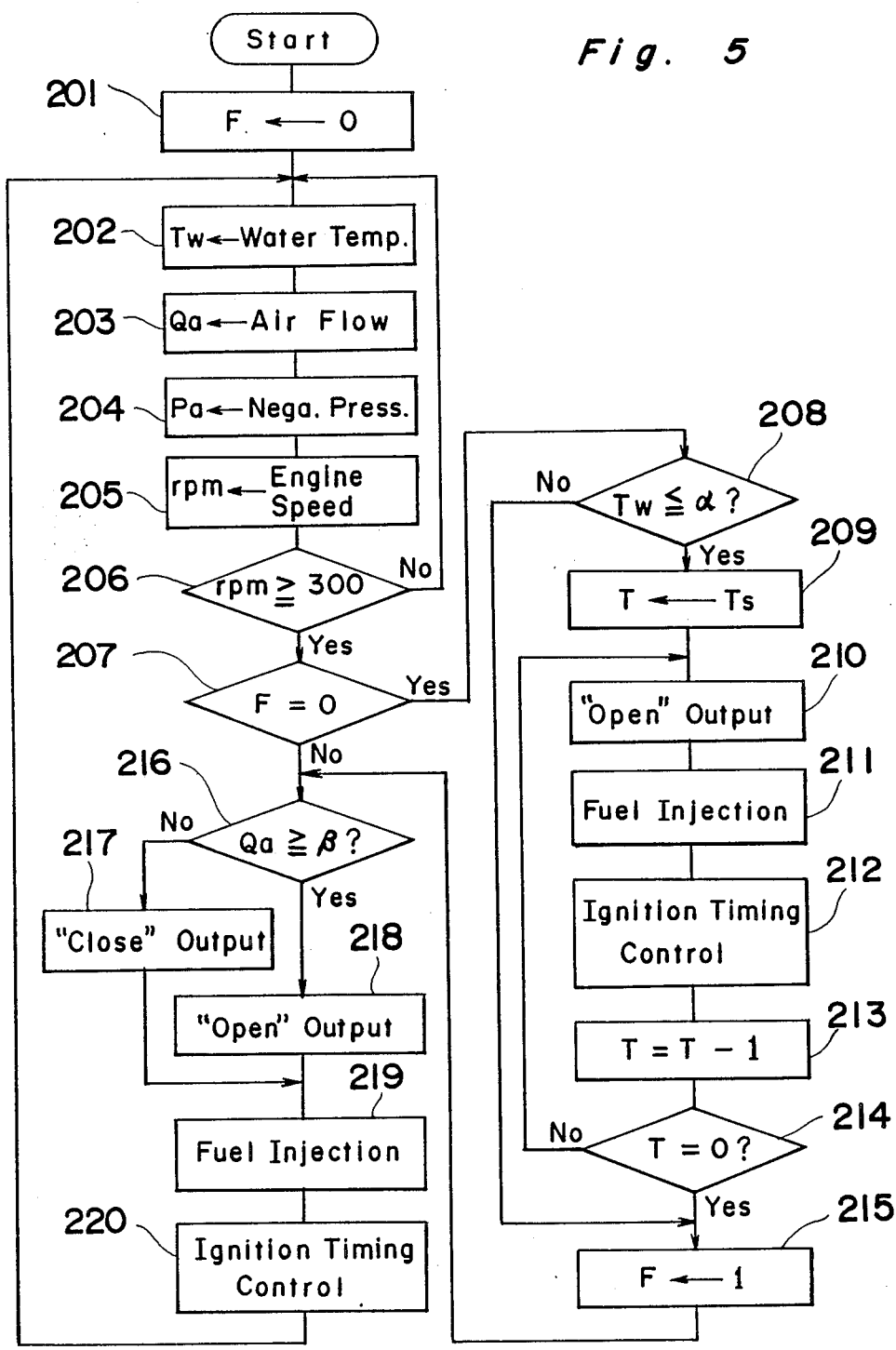
FIG. 5 is a flowchart showing the sequence of control of the choke valve in the second embodiment of the present invention.

In the embodiment shown in FIGS. 4 to 6, a different actuator for the choke valve 18 as well as a different method of control of the actuator are employed.

Referring first to FIG. 6, an actuator 45 for the choke valve 18 is in the form of a diaphragm actuator comprising a housing having a working chamber 45a defined between the wall of the housing and a diaphragm member 45b operatively coupled with the choke valve 18 through the connecting rod 30c. As is the case with the actuator 30 used in the foregoing embodiment, a spring 45c is housed within the working chamber 45a urging the diaphragm member 45b and, hence, the connecting rod 30c in one direction required to open the choke valve 18, which direction is counter to the direction shown by B. The working chamber 45a is communicated with the intake piping downstream of the throttle valve 13 through a pressure passage 40 having disposed therein a one-way valve 42 and an electromagnetically operated control valve 41 adjacent the intake piping 5 and the actuator 45, respectively. The one-way valve 42 is operable to open the passage 40 only when, during the opening of the control valve 41, the pressure in the system including the working chamber 45a is higher than the pressure inside the intake piping 5 downstream of the throttle valve 13. However, the control valve 41 is so structured as to permit the introduction of atmospheric pressure into the working chamber 45a through a filter 43 when the valve 41 is held in position to interrupt the communication between the working chamber 45a and the intake piping 5 through the passage 41.

In the construction so far described, when the negative pressure is introduced into the working chamber 45a overcoming the force of the spring 45c, the diaphragm member 45b and, hence, the connecting rod 30c, is displaced in the direction B with the choke valve 18 consequently closed. However, either so long as no negative pressure is introduced into the working chamber 45a or when during the introduction of the negative pressure into the working chamber 45a the control valve 41 is closed to interrupt the negative pressure introduction through the passage 40, the connecting rod 30c displaces in the direction counter to the direction B as urged by the spring 45c and, therefore, the choke valve 18 is opened.

It is to be noted that, in the embodiment shown in FIG. 4, both the relief passage 37 and the metering valve 38 such as employed in the foregoing embodiment of FIG. 1 are not employed.

The control of the choke valve 18 according to the second preferred embodiment of the present invention will now be described with particular reference to FIGS. 5 and 6.

When the control of the choke valve 18 performed by the computer 25 is rendered incident to the start of the engine, the flag representing an operating condition of the choke valve 18 is set to zero at step 201 and, then, the water temperature Tw detected by the temperature sensor 29, the flow Qa of the suction air detected by the air flowmeter 12, the negative pressure Pa detected by the pressure sensor 27 downstream of the throttle valve 13, and the engine speed rpm detected by the speed sensor 26 are successively read in by the computer 28 at respective steps 202, 203, 204 and 205.

At step 206, a decision is made to determine if the combustion of the combustible charge within the combustion chamber 4 has completed, in terms of the engine speed rpm which exceeds a predetermined value, for example, 300 rpm upon the complete combustion. If the combustion of the combustible charge has not yet completed, the program flow returns to step 202, repeating the previous program flow until the combustion of the combustible charge is found to have completed.

In the event that the result of decision at step 207 has indicated that the combustion of the combustible charge has completed, either the following program flow from step 208 to step 220 or the following program flow from step 216 to step 220 is executed depending on the result of decision rendered at step 207.

ENGINE WARM-UP

The decision at step 207 is to determine if the flag F representative of the operating condition of the choke valve 18 is zero. Since immediately after the start of the engine with the combustion of the combustible charge completed, the flag F is zero, the control for accelerating the warm-up is executed. For this purpose, if at step 208 it is determined that the water temperature Tw of the engine cooling system has not yet reached a predetermined value α which is a parameter indicative of the completion of warm-up, a predetermined time Ts designed for the purpose of the program for the computer 25 is set in a timer T at step 209. The predetermined time Ts is selected in consideration of the time required for the engine to be warmed up subsequent to the engine start. At subsequent step 210, the "Open" signal is issued to the choke valve 18. As hereinbefore described, this "Open" signal is in practice the "Close" command signal applied to the control valve 41 to close the latter so that the working chamber 45a of the actuator 45 can be communicated to the atmosphere to permit the choke valve 18 to open by the action of the spring 45c transmitted thereto through the connecting rod 30c and the linkage 30f. In this connection with the choke valve opened, both of the low and high speed gas passages 16 and 17 are utilized for the flow of the exhaust gases towards the catalytic converter 19 through the turbine 9.

At step 211, for the purpose of accelerating the warm-up of the catalytic converter 19, the fuel is injected into the engine cylinder 1 in an increased quantity which is the product of the regular quantity of fuel, determined to correspond with the quantity (Qa/rpm) of suction air drawn per revolution of the engine, times a predetermined rate r (r>1) of fuel increase. By so doing, the combustible charge introduced into the engine cylinder 1 is enriched so that the temperature of combustion of the combustible mixture can be increased with an aim at increasing the temperature of the exhaust gases.

Following the injection of the increased quantity of fuel, the ignition timing is controlled at step 212. More specifically, the ignition timing is retarded a predetermined angle which is the product of the normal spark advance angle IG, determined in dependence on the engine operating condition then assumed by the engine, for example, a combination of negative pressure Pa in the intake piping 5 and the engine speed rpm, times a suitable rate λ of retardation. When the ignition timing is so retarded, the timing at which the combustion of the combustible charge starts is retarded and, therefore, the exhaust gases of relatively high temperature obtained immediately after the combustion are exhausted incident to the start of the exhaust stroke. In this way, the exhaust gases can be increased in temperature.

At step 213 subsequent to step 212, the timer T is decremented by 1. The warm-up control represented by the program flow from step 210 to 213 is repeated up until at step 214 the preset value of the timer T becomes zero. In other words, during the preset time Ts subsequent to the engine start, the choke valve 18 is opened, the amount of fuel to be injected is kept increased, and the ignition timing is kept retarded. However, after the preset time Ts has become zero, step 215 is followed by step 216 at which the flag F is set to "1", after which does the program flow proceed to step 216.

NORMAL OPERATION AFTER ENGINE WARM-UP

Since as hereinbefore described the flag F is set to "1" at step 205 when and after the engine has been warmed up, the program flow for the warm-up acceleration from step 208 to step 215 is not executed and, instead, the program flow from step 216 to step 220 is executed. At step 216, a decision is made to determine if the flow Qa of the suction air being drawn has attained a predetermined value β which represents the limit over which, as shown in FIG. 6, because of the increased flow Qa with increase of the engine speed, the increased flow resistance results in only with the low speed gas passage 16 to such an extent that the power output of the turbine may be reduced. During the low speed operating condition of the engine at which time the flow Qa is smaller than the predetermined value β, the choke valve 18 is kept closed at step 217, whereas during the high speed engine operating condition at which time the flow Qa is equal to or greater than the predetermined value, the choke valve 18 is opened at step 18.

Then, regardless of whether the choke valve 18 is opened or whether the choke valve 18 is closed, a single injection of fuel is carried out at step 219, followed by step 220 at which a single ignition takes place at the ignition timing IC calculated in dependence on the combination of the negative pressure Pa and the engine speed.

Although in the foregoing embodiment the determination of whether or not the catalytic converter is cold has been described as made in reference to the temperature of the water used to cool the engine, it may be possible to use an additional exhaust temperature sensor 44 for detecting the temperature inside the catalytic converter 19 as shown by the broken line in FIG. 4. In this case, the warm-up control can be executed in dependence on the temperature inside the catalytic converter before the latter is sufficiently warmed up.

For accelerating the warm-up of the catalytic converter 19, instead of the amount of injected fuel being increased and the ignition timing being retarded, the flow of the suction air may be increased.

Figure 7:
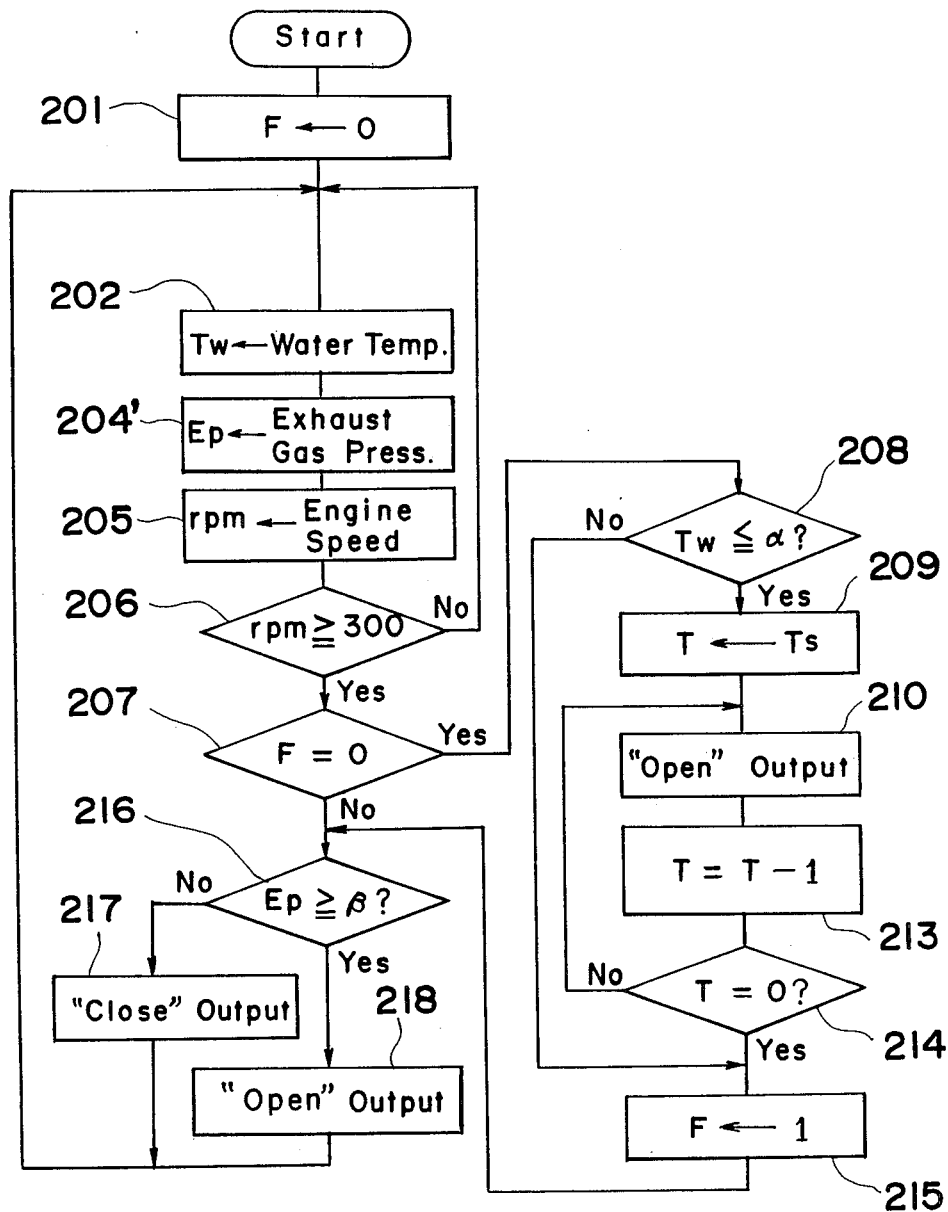
FIG. 7 illustrates a modification of the program flow of FIG. 5.

Moreover, instead of the program flow shown in FIG. 5, such a program flow as shown in FIG. 7 may be employed for execution by the computer 25. Not only is the program flow of FIG. 7 simpler than that of FIG. 5, the exhaust pressure Ep is employed as one of the parameters for the ultimate control of the choke valve 18 instead of both the air flow Qa and the negative pressure Pa as shown in FIG. 5.

Although the present invention has been described in connection with the preferred embodiments with reference to the accompanying drawings, it is to be noted that various changes and modifications are apparent to those skilled in the art. By way of example, in any one of the foregoing embodiments, the choke valve 18 has been shown and described as used to selectively open and close one of the gas passages which are defined in the exhaust piping 6 by partitioning that portion of the piping 6 adjacent the turbine inlet, the choke valve 18 may be modified so as to adjust the effective cross-section of that portion of the piping 5 adjacent the turbine inlet, or the concept of the present invention can be equally applicable to the automobile turbocharger system comprising separate turbochargers for low speed and high speed use, respectively, the turbine of the low speed turbocharger communicated with the engine exhaust port through a gas passage of smaller inner diameter than that of the gas passage leading to the turbine of the high speed turbocharger. In the latter case, the choke valve 18 may be used to selectively close and open the gas passage leading to the turbine of the high speed turbocharger in the same manner as the illustrated selective closure and opening of the high speed gas passage 17.

Accordingly, such changes and modifications are to be understood as included within the scope of the present invention as defined by the appended claims unless they depart therefrom.

What is claimed is:

1. A control system for an automobile engine having intake and exhaust systems for respectively conducting intake gases to and exhaust gases from the engine, which comprises, in combination:
   a turbocharger including a turbine disposed in the exhaust system and adapted to be driven by the flow of the exhaust gases therethrough and a blower disposed in the intake system and drivingly connected with the turbine for supercharging the intake gases;
   an exhaust purifying device disposed in the exhaust system downstream of the turbine with respect to the direction of flow of the exhaust gases;
   a regulating means for varying the effective cross-section of a portion of the exhaust system leading to the turbine;
   a control means for controlling the regulating means in dependence on an operating condition of the engine, said control means causing the regulating means to decrease the effective cross-section during a low speed operating condition, but to increase the effective cross-section during a high speed operating condition of the engine; and
   a correcting means for controlling the regulating means to increase the effective cross-section during a particular engine operating condition associated with a cold start of the exhaust purifying device.

2. A system as claimed in claim 1, wherein the particular engine operating condition is a condition in which the temperature of the engine is lower than a predetermined value.

3. A system as claimed in claim 2, wherein the temperature of the engine is represented by that of water used to cool the engine.

4. A system as claimed in claim 1, wherein the particular engine operating condition is represented by a predetermined time subsequent to the start of the engine.

5. A system as claimed in claim 4, wherein the predetermined time is a period during which the temperature of the engine is lower than a predetermined temperature.

6. A system as claimed in claim 1, wherein the particular engine operating condition is a condition in which the exhaust purifying device exhibits a temperature lower than a predetermined value.

7. A system as claimed in claim 1, further comprising a warm-up acceleration control means for effecting at least during the particular engine operating condition at least one of correction to increase the flow of suction air flowing through the intake system towards the engine, correction to increase the amount of fuel to be injected into the intake system and correction to retard the ignition timing.

8. A system as claimed in claim 7, wherein the particular engine operating condition is a condition in which the temperature of the engine is lower than a predetermined value.

9. A system as claimed in claim 8, wherein the temperature of the engine is represented by that of water used to cool the engine.

10. A system as claimed in claim 7, wherein the particular engine operating condition is represented by a predetermined time subsequent to the start of the engine.

11. A system as claimed in claim 10, wherein the predetermined time is a period during which the temperature of the engine is lower than a predetermined temperature.

12. A system as claimed in claim 7, wherein the particular engine operating condition is a condition in which the exhaust purifying device exhibits a temperature lower than a predetermined value.

13. A control system for an automobile engine having intake and exhaust systems for respectively conducting intake gases to and exhaust gases from the engine, which comprises, in combination:
   a turbocharger including a turbine disposed in the exhaust system and adapted to be driven by the flow of the exhaust gases therethrough and a blower disposed in the intake system and drivingly connected with the turbine for supercharging the intake gases;
   an exhaust purifying device disposed in the exhaust system downstream of the turbine with respect to the direction of flow of the exhaust gases;
   a portion of the exhaust system between the engine and the turbine and adjacent the turbine being constituted by at least first and second separate passage portions;
   a valve means operable to close and open the first passage portion during a low speed operating condition of the engine and during a high speed operating condition of the engine; and
   a correcting means for controlling the valve to increase the effective cross-section during a particular engine operating condition associated with a cold start of the exhaust purifying device.

14. A system as claimed in claim 13, wherein the valve means opens the first passage portion during the high speed engine operating condition in which a variable similar to the amount of the exhaust gases emitted from the engine is higher than a predetermined value, but closes the first passage portion during the low speed engine operating condition in which the variable is lower than the predetermined value.

15. A system as claimed in claim 14, wherein the variable is the pressure of the exhaust gases downstream of the turbine.

16. A system as claimed in claim 14, wherein the variable is the amount of the suction air drawn through the intake system towards the engine.

17. A system as claimed in claim 13, further comprising an actuating means for the valve means, said actuating means being a diaphragm means having a first working chamber defined therein, said diaphragm means causing the valve means to open the first passage portion when the pressure of the exhaust gases upstream of the turbine is introduced in the first working chamber.

18. A system as claimed in claim 17, wherein the diaphragm means also has a second working chamber defined therein, said diaphragm means causing the valve means to close the first passage portion when the negative pressure developed in the intake system downstream of a throttle valve disposed therein is introduced into the second working chamber, and further comprising an exhaust pressure passage fluid-connected between the first working chamber and the exhaust system upstream of the turbine, a first control valve disposed in the exhaust pressure passage, a negative pressure passage fluid-connected between the second working chamber and the intake system downstream of the throttle valve, a second control valve disposed in the negative pressure passage, and a control device operable to open both the first and second control valves during the particular engine operating condition, to open and close the first and second control valves, respectively, during the high speed engine operating condition and to close both the first and second control valves during the low speed engine operating condition.

19. A system as claimed in claim 13, further comprising a bypass passage in the exhaust system bypassing the turbine and having a wastegate valve disposed therein, said wastegate valve opening the bypass passage when the pressure of the suction air which has been supercharged by the blower exceeds a predetermined value.

20. A system as claimed in claim 19, further comprising a wastegate actuator for the wastegate valve, a pressure introducing passage for the introduction of the supercharged pressure to the wastegate actuator, a relief control valve disposed in the pressure introducing passage, and a control unit for controlling the opening of the relief control valve according to an operating condition of the engine.

* * * * *